July 5, 1949.    R. L. BRIGGS    2,474,816
WELDING MECHANISM

Filed Oct. 8, 1946    3 Sheets-Sheet 1

INVENTOR
RUFUS L. BRIGGS
BY Elmer J. Gorn
ATTY.

July 5, 1949.  R. L. BRIGGS  2,474,816
WELDING MECHANISM
Filed Oct. 8, 1946  3 Sheets-Sheet 2
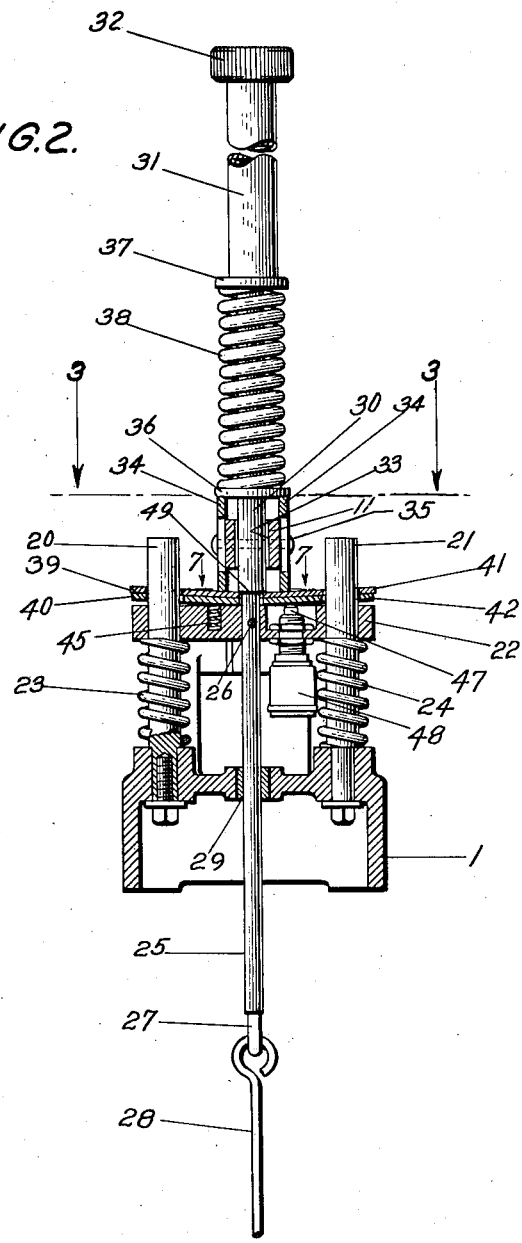
INVENTOR
RUFUS L. BRIGGS
BY Elmer J. Gorn
ATTY.

July 5, 1949.   R. L. BRIGGS   2,474,816
WELDING MECHANISM
Filed Oct. 8, 1946   3 Sheets-Sheet 3
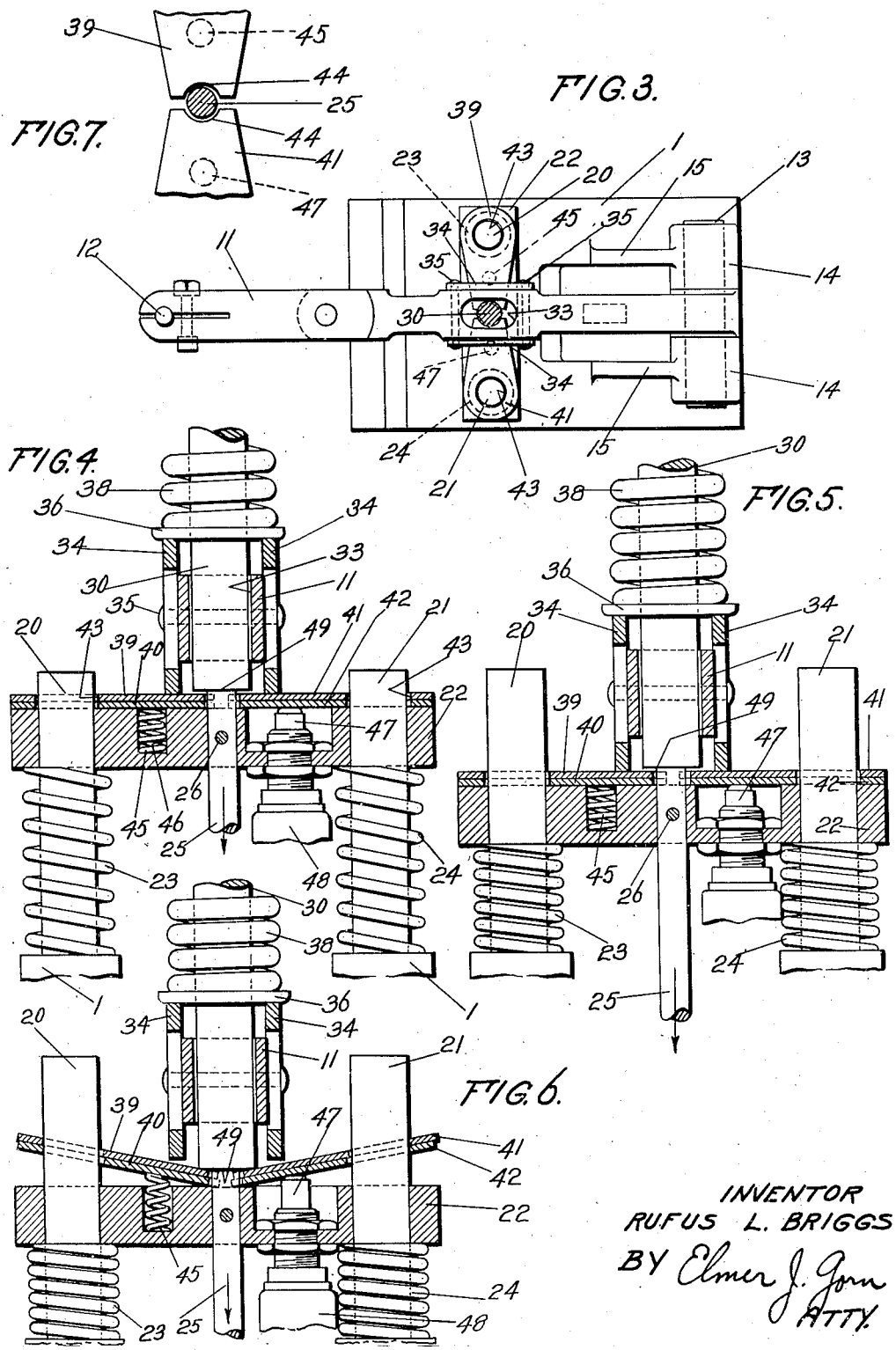
INVENTOR
RUFUS L. BRIGGS
BY Elmer J. Gorn
ATTY.

Patented July 5, 1949

2,474,816

UNITED STATES PATENT OFFICE 2,474,816

WELDING MECHANISM

Rufus L. Briggs, Melrose, Mass., assignor to Raytheon Manufacturing Company, Newton, Mass., a corporation of Delaware Application October 8, 1946, Serial No. 701,869

15 Claims. (Cl. 219—4)

This invention relates to a mechanism for welding, particularly for resistance welding, and concerns the mechanism for moving a movable electrode into operative position adjacent a stationary electrode, and for applying sufficient force to clamp or hold the work under proper pressure between these electrodes.

An object of the present invention is to devise a novel manual or foot-operated welding head or welding pressure device.

Another object is to devise a welding head by means of which the pressure on the weld may be increased to a preselected value at which point the welding energy is applied and the pressure source locked out.

A further object is to devise a welding head by the use of which a preselected pressure may be applied to the weld, regardless of variations due to manual operation of the pressure means.

A further object is to devise a welding head whereby a preselected pressure is applied to the weld and is maintained during the weld.

A still further object is to provide a welding head which will operate correctly with wide variations in electrode adjustment or stock thickness, without the necessity of making any adjustments in said head.

The foregoing and other objects of the invention will be best understood from the following description of an exemplification thereof, reference being had to the accompanying drawings, wherein:

Fig. 2 is a vertical section taken along line 2—2 of Fig. 1, but with the outer casing removed;

Fig. 3 is a horizontal section taken along line 3—3 of Fig. 2;

Figure 1:
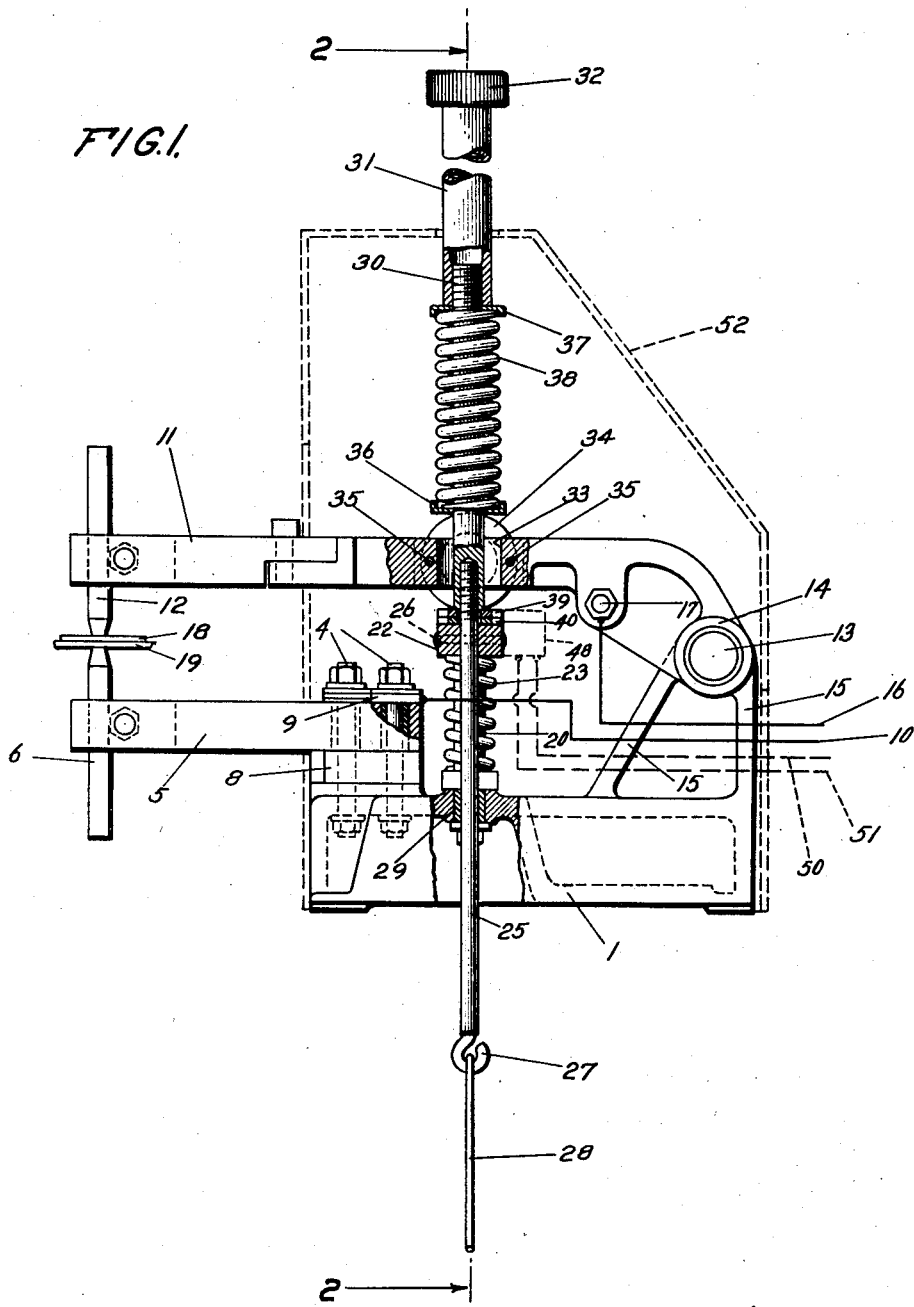
Fig. 1 is a vertical section taken approximately through the center of a welding head embodying this invention.

Figs. 4, 5, and 6 are partial sectional views of the operating mechanism, similar to Fig. 2 but on an enlarged scale, showing three different positions during the actuation of the head; and Fig. 7 is a partial horizontal sectional view taken along line 7—7 of Fig. 2.

Referring now to the drawings, reference numeral 1 indicates a base member which is of relatively heavy construction and is adapted to be fixedly mounted upon a suitable support or table (not shown). Attached, as by means of bolts 4, to base 1 is a bracket 5 which provides a support for a stationary electrode 6, a block of suitable insulating material 8 being placed between said bracket and said base. A conducting member 9 is suitably insulated from bolts 4, making contact with bracket 5, and is provided with a screw or other fastening means for attaching a lead 10 connecting the electrode 6 with one of the outlets of a suitable source of welding current.

An upper welding arm 11 carrying a movable electrode 12 is rigidly attached at its inner end to a pin 13 which is mounted for pivotal movement in a pair of bearings 14 which are fixed to base 1, for example by upwardly-projecting arms 15. A lead 16, which is connected to the other outlet of the source of welding current, is suitably attached, as by a screw 17, to the arm 11. The pieces 18 and 19 to be resistance-welded, in accordance with the usual practice, are positioned between electrodes 6 and 12.

Rigidly attached to opposite sides of base 1 are a pair of spaced vertical control posts 20 and 21, which are relatively elongated. An anvil 22, which is of sufficient width to span said control posts, has a pair of apertures therein which are aligned with said control posts; by means of these apertures the anvil 22 is mounted on the control posts 20 and 21 in such a way that it is free to slide up and down said posts. The anvil is resiliently biased upwardly by a pair of return springs 23 and 24 one of which is mounted around each of the control posts 20 and 21 respectively; one end of each spring engages the upper surface of base 1 and the opposite end of each spring engages the lower surface of anvil 22. In order to positively slide the anvil 22 downwardly on the control posts, a central control rod 25 is provided, this rod being rigidly attached, as by a pin 26, to said anvil, and being provided at its lower end with a hook 27 to which is attached a steel cable or link 28 connected to a pedal lever or other source of power or pressure (not shown). Control rod 25 passes vertically downward from anvil 22 through a suitable bearing 29 fixed in base 1.

Rigidly attached to the upper end of control rod 25 is a control rod extension 30 whose diameter is somewhat larger than that of rod 25. Threadedly mounted on the upper end of extension 30, and capable of threaded movement or adjustment with respect thereto, is a pressure adjusting knob or sleeve 31 which is of somewhat larger diameter than is said extension. Knob 31 has a knurled head 32 at its upper end to allow for facile manual adjustment of said knob on extension 30.

Control rod extension 30 passes freely through an aperture or slot 33 in the upper welding arm 11, said aperture being of sufficient size to permit unrestricted movement of the control rod and control rod extension with respect to arm 11, and also being of sufficient size to permit pivotal movement of said arm, unhampered by the vertically-extending control rod and control rod extension, to an extent sufficient for the insertion of the desired work 18—19 between the electrodes 6 and 12. A pair of control washers 34 is provided, the external diameter of these washers being somewhat greater than the height or thickness of arm 11; one of these washers is rigidly attached, for example by rivets 35, to each of the opposite side faces of arm 11 in such a way that equal heights of the washers project above and below said arm.

An action washer 36 rests on the upper surfaces of washers 34, while another action washer 37 is adapted to contact the lower surface of sleeve 31; both of these action washers are mounted on control rod extension 30 but are free to move with respect thereto. A weld pressure spring 38 is held between washers 36 and 37, this spring loosely surrounding control rod extension 30.

Two pairs of cramp plates 39, 40, 41, 42 are provided, each of these plates having the shapes shown in Figs. 3 and 7. These plates lie on the upper surface of anvil 22, one superposed pair 39—40 lying on the left side of control rod 25 and the other superposed pair 41—42 lying on the right side of said control rod. Each of the four cramp plates is provided with an enlarged aperture 43 therethrough near its outer or wider end, which permits the cramp plates to move freely with respect to the corresponding control post 20 or 21, the pairs of cramp plates being of such dimensions as to extend to the left or right ends of the anvil. The inner or narrower edge of each of the cramp plates has an arcuate recess 44 cut therein approximately centrally thereof, this recess being of sufficient radius to allow tilting movement of the cramp plates unobstructed by control rod 25. Each pair of cramp plates is resiliently biased upwardly or away from the upper surface of anvil 22, the pair 39—40 being biased by a compression spring 45 which is positioned in a recess 46 in the upper surface of anvil 22, said recess being located intermediate the shoulder 49 provided by the lower end of control rod extension 30 and the control post 20, one end of the spring bearing against the bottom of recess 46 and the opposite end of said spring bearing against the lower face of cramp plate 40. The pair of cramp plates 41—42 is biased upwardly by a spring in the operating rod 47 of a normally-closed microswitch or precision snap-action firing switch 48 which is mounted in anvil 22 in such a position that the center of operating rod 47 thereof contacts the lower surface of cramp plate 42 at a point intermediate shoulder 49 and control post 21, said point being located the same distance from the center of control rod 25 as is the point at which the center of spring 45 contacts cramp plate 40 but diametrically opposite therefrom. It will be seen that the spring 45 and the microswitch 48 are fixedly attached to anvil 22 and move therewith.

Two leads 50 and 51 extend from microswitch 48 to the control circuit of the welding current source, the control circuit of said source being so arranged that when the contacts of said microswitch are opened, welding current will be supplied, by means of leads 10 and 16, to electrodes 6 and 12 to effect a weld at the work 18—19.

The lower surfaces of control washers 34 normally (that is, when the electrodes are apart) contact the upper surfaces of cramp plates 39 and 41, while normally the shoulder 49 of the control rod is spaced slightly above the upper surface of said cramp plates. Therefore, return springs 23 and 24 under anvil 22 hold up welding arm 11 through control washers 34 which are fixed to said arm. The weld pressure spring 38 is arranged to provide a "locked-in" pressure, so that normally, when the electrodes are apart, spring 38 pushes downwardly against control washers 34, thereby holding said washers firmly against the upper cramp plates 39 and 41 and thereby also holding the upper arm 11 against the anvil 22. Therefore, normally the force which holds the upper arm against the anvil opposes the upward force exerted against the cramp plates by spring 45 and the spring in operating rod 47, and the four cramp plates are held flat against the anvil. However, as will be described later, when the anvil 22 moves away from the lower surfaces of washers 34, this opposing force is released and the cramp plates are free to move upwardly under the action of the two biasing means 45 and 47.

If desired, an open-bottomed shell or casing 52 may be placed about the periphery of base 1, a slot being provided in the front of the casing for the passage therethrough of bracket 5 and arm 11, a slot in the rear thereof for the passage therethrough of leads 10, 16, 50, and 51, and an aperture in the top thereof for the passage therethrough of the top of pressure-adjusting knob 31.

Figs. 4–6 show three successive positions of the above-described mechanism, which figures will enable the operation of said mechanism to be more readily understood. Fig. 4 is a section through the control mechanism, showing the relative position of the elements when the electrodes are apart. It will be noted that anvil 22 is near the top of the control posts 20 and 21, that cramp plates 39—42 are held flat against the force of the biasing means 45 and 47 by the force of weld pressure spring 38 acting on said cramp plates through control washers 34, and that return springs 23 and 24 are in their normal unstressed condition.

Now, if the control rod 25 is moved downwardly by a pedal or other means attached thereto, anvil 22 will be caused to slide downwardly on control posts 20 and 21 against the action of return springs 23 and 24, since the anvil is pinned to the control rod at 26. Since the upper arm 11 is held against the anvil 22 through the control washers 34 by means of the "locked-in" pressure of the weld pressure spring 38, the upper welding arm 11 carrying the electrode 12 will move downwardly about its pivot 13—14. It will be noted that the "locked-in" pressure of the weld pressure spring 38 is maintained on control washers 34, and thereby also on arm 11, cramp plates 39—42 and anvil 22, during this movement, thus holding said arm against said anvil and said cramp plates flat against said anvil, and causing said arm to follow the movements of said anvil; this "locked-in" pressure is maintained during this interval because the upper and lower action washers 37 and 36 of the weld pressure spring 38 are both moving downward at the same rate, lower action washer 36 moving because of the movement of control washers 34 which it contacts, and upper action washer 37 moving because of the movement of adjusting knob 31 which it contacts and which is fixed to control rod extension 30.

The "locked-in" pressure of the weld pressure spring, as stated above, holds the cramp plates 39—42 flat against the anvil 22 during the above movement because of the forced engagement of control washers 34 with said plates. As will be more fully described hereinafter, the downward motion of the anvil is possible only as long as these cramp plates are lying flat; tilting of the plates causes a jamming or wedging action to take place which effectively prevents downward movement of the anvil.

Fig. 5 shows the control mechanism just as the the electrodes touch the work, after the above-described movements have taken place. Note that the anvil has been brought down along the control posts 20 and 21 against springs 23 and 24 by the action of an operating force on the control rod 25, the welding arm 11 moving downwardly about its pivot as described above, at the same time.

As soon as the upper electrode 12 touches the work 18—19, further downward motion of the upper arm 11 and of the control washers 34 attached thereto ceases, since such motion is stopped by the physical contact of the work with electrode 12. As the anvil 22 continues to travel downward due to continued downward pull on control rod 25, the control washers 34, since their motion has stopped, are effectively lifted off the cramp plates 39—42.

The cramp plates are now lifted or moved upwardly relative to the anvil by the biasing means 45 and 47. As the anvil 22 moves downwardly, the cramp plates are effectively held stationary due to the upward movement of the same relative to anvil 22 by the biasing means 45 and 47. As control rod 25 moves downwardly, the shoulder 49 thereof engages the inner ends of the cramp plates 39—42. As a result of this engagement, of the continued downward movement of shoulder 49 by control rod 25, and of the upward force of the biasing means 45 and 47, the cramp plates 39—42 are caused to tip or tilt, with their outer edges travelling upwardly on the control posts 20 and 21 relative to their inner edges. At a certain point in their tilting movement, the inner surfaces of the holes 43 "bite" into control posts 20 and 21 and a jamming or wedging action takes place between these fixed control posts, on the one hand, and shoulder 49 and/or control rod 25, on the other, which effectively and positively prevents any further downward movement of the anvil and the control rod.

When this point is reached, the operating rod 47 on the firing switch 48 has risen far enough to open the contacts of said switch, thereby operating the switch to apply welding energy to the weld.

As above described, the control rod 25 moves downwardly, after the electrodes touch the work due to continued downward pull on the control rod, until the cramp plates lock on the control posts to prevent further downward movement of the control rod and anvil. During this downward movement of the control rod while arm 11 and control washers 34 are stationary, action washer 36 at the lower end of weld pressure spring 38 is stationary, while the upper action washer 37 is moving downwardly due to the downward movement of pressure adjusting knob 31 which is fixed to control rod extension 30. Therefore, pressure spring 38 is compressed with a force in addition to the "locked-in" pressure of said spring, this force being transmitted to action washer 36, control washers 34, and welding arm 11 to force the electrode 12 down on the work 18—19 with increased pressure. When the cramp plates 39—42 lock on the control posts, as above described, further downward movement of the control rod and the anvil is prevented, so that the pressure of the electrodes on the work remains fixed at the aforesaid increased value during the weld.

Fig. 6 shows the control mechanism in its final position, that is, the position during the actual welding operation. Note that the control washers 34, action washer 36, and welding arm 11 are in the same positions relative to the fixed control posts 20 and 21 as in Fig. 5, that control rod 25 and anvil 22 have moved downwardly with respect to the control posts from their positions in Fig. 5, that the cramp plates 39—42 have been tilted and locked on the control posts by the biasing means 45 and 47 and shoulder 49, that return springs 23 and 24 have been compressed from their Fig. 5 positions, and that weld pressure spring 38 has been slightly compressed from its Fig. 5 position. Operating rod 47 has moved upwardly with respect to the body of the switch 48 enough to operate said switch to apply welding energy to the weld.

The total pressure applied to the weld is the sum of two pressures, one being the "locked-in" pressure of the weld pressure spring 38 (which can be manually adjusted or varied by means of pressure adjusting knob 31), and the other being the pressure applied through control rod 25 after the movement of the welding arm 11 has stopped but before the cramp plates have locked on the control posts. It will be apparent, therefore, that the pressure on the weld is increased to a preselected value, at which time the welding energy is applied due to the operation of switch 48, and at which time the pressure source is locked out by the jamming or wedging action of the cramp plates 39—42. As is apparent from Fig. 6, due to the jamming action of the cramp plates, the operator cannot bring the control rod 25 down any further than is shown in said figure, and hence cannot increase the weld pressure; the operating force is effectively locked out.

This locking and increasing pressure action starts only when the electrodes have touched the work (the Fig. 5 position), and is not dependent upon the relative point in the operation at which this touching occurs. This can be seen from the fact that the control washers 34 are not lifted off the cramp plates until the electrodes touch the work. Since this action starts only when the electrodes have touched the work, and is independent of any other factors, the welding head of this invention will operate correctly with wide variations in electrode adjustment or stock thickness, without the necessity of making any adjustments in the head.

When welding energy is supplied to two pieces of material to be welded, a certain fushion of the two pieces with each other occurs, so that the two surfaces of the pieces opposite the weld (that is, the lower surface of the lower piece and the upper surface of the upper piece) move toward each other. This period of movement during the weld is known as the "follow-up" period of the weld, and it is necessary to maintain pressure on the weld during this period. With the device of this invention, the only mechanism left to move during said period is the upper arm 11 and the pressure spring 38, the upper arm following the relative displacement of the upper surface of piece 18 because of the contact of upper electrode 12 with said surface. Since the only mechanism which moves during the "follow-up" period is the upper arm and pressure spring, there will be a minimum of inertia to oppose said movement and the consequent maintaining of pressure on the weld during said period. Also, due to the fact that the pressure spring 38 is much closer to the upper arm pivot 13—14 than is the electrode 12, the total motion of said spring will be only a fraction of that motion experienced at the electrodes during the "follow-up" period, so that the resistance to motion during this period will be very small indeed.

When the downward force exerted on control rod 25 is released, return springs 23 and 24 will move anvil 22 upwardly on the control posts 20 and 21, the cramp plates 39—42 offering no resistance to this movement since they are on the upper face of the anvil. As the anvil moves upwardly, the position of Fig. 5 will be reached, in which control washers 34 are engaged by the cramp plates, compressing the biasing means 45 and 47. The anvil continues to move upwardly, lifting the arm 11 and electrode 12 off the work, the entire control mechanism now moving upward as a unit until the original position of Fig. 4 is reached, the mechanism then being ready for another operation.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. In a welding machine of the type having a fixed electrode and a movable electrode, means to move said movable electrode into contact with the work, pressure-exerting means effective after such contact to apply a pressure to said electrodes thereby placing such pressure upon the work, means effective to prevent the application by said pressure-exerting means to the work of a pressure in excess of a preselected pressure, and means effective upon the application of said preselected pressure for sending a welding current through said work.

2. In a welding machine of the type having a fixed electrode and a movable electrode, mechanism for operating said movable electrode comprising a member slidably mounted on a fixed support, movable control means for effecting sliding movement of said member, means resiliently coupling said movable electrode to said member in such a manner that when said member slides in one direction said movable electrode is moved into contact with the work, said control means being effective on further movement thereof after such contact to apply a pressure to said electrodes thereby placing such pressure upon the work, and means effective to limit said further movement of said control means.

3. In a welding machine of the type having a fixed electrode and a movable electrode, mechanism for operating said movable electrode comprising a member slidably mounted on a fixed support, movable control means attached to said member for effecting sliding movement thereof, a movable arm supporting said movable electrode, means resiliently biasing said arm into engagement with said member whereby when said member slides in one direction said movable electrode is moved into contact with the work, said control means being effective on further movement thereof after such contact to apply a pressure to said electrodes thereby placing such pressure upon the work, and means effective to limit said further movement of said control means.

4. In a welding machine of the type having a fixed electrode and a movable electrode, mechanism for operating said movable electrode comprising a member slidably mounted on a fixed support, movable control means attached to said member for effecting sliding movement thereof, a movable arm supporting said movable electrode, a normally-stressed resilient means connected between said control means and said arm for biasing said arm into engagement with said member, whereby when said member slides in one direction said movable electrode is moved into contact with the work, said resilient means being effective on further movement of said control means after such contact to transmit pressure from said control means to said arm thereby placing such pressure upon the work, and means effective to limit said further movement of said control means.

5. In a welding machine of the type having a fixed electrode and a movable electrode, mechanism for operating said movable electrode comprising a fixed support, a member slidably mounted thereon, means resiliently coupling said movable electrode to said member in such a manner that when said member slides in one direction said movable electrode is moved into contact with the work, a plate lying atop said member, said plate normally lying flat but being adapted to be tilted to wedge against said support to stop the sliding movement of said member, and means for tilting said plate subsequent to the contact of the movable electrode with the work.

6. In a welding machine of the type having a fixed electrode and a movable electrode, mechanism for operating said movable electrode comprising a pair of fixed supports, a member slidably mounted thereon, a control rod attached to said member intermediate said supports, said rod being movable to effect sliding movement of said member, means resiliently coupling said movable electrode to said member in such a manner that when said member slides in one direction said movable electrode is movd into contact with the work, a separate plate lying atop said member on each side of said rod between said rod and the adjacent support, said plates normally lying flat but being adapted to be tilted to wedge between each support and the corresponding side of said rod to stop the sliding movement of said rod and said member, and means for tilting said plates subsequent to the contact of the movable electrode with the work.

7. In a welding machine of the type having a fixed electrode and a movable electrode, mechanism for operating said movable electrode comprising a fixed support, a member slidably mounted thereon, means resiliently coupling said movable electrode to said member in such a manner that when said member slides in one direction said movable electrode is moved into contact with the work, a plate lying atop said member, said plate normally lying flat but being adapted to be tilted to wedge against said support to stop the sliding movement of said member, means for tilting said plate subsequent to the contact of the movable electrode with the work, and a switch operated by the tilting of said plate to control the welding circuit supplying current to said electrodes.

8. In a welding machine of the type having a fixed electrode and a movable electrode, mechanism for operating said movable electrode comprising a fixed support, a member slidably mounted thereon, means resiliently coupling said movable electrode to said member in such a manner that when said member slides in one direction said movable electrode is moved into contact with the work, a plate lying atop said member, said plate normally lying flat but being adapted to be tilted to wedge against said support to stop the sliding movement of said member, a shoulder on said rod positioned above said plate for engagement with one end thereof, and resilient means for biasing said plate upwardly against said shoulder, subsequent to the contact of the movable electrode with the work, to thereby tilt said plate.

9. In a welding machine of the type having a fixed electrode and a movable electrode, mechanism for operating said movable electrode comprising a pair of fixed supports, a member slidably mounted thereon, a control rod attached to said member intermediate said supports, said rod being movable to effect sliding movement of said member, means resiliently coupling said movable electrode to said member in such a manner that when said member slides in one direction said movable electrode is moved into contact with the work, a separate plate lying atop said member on each side of said rod between said rod and the adjacent support, said plates normally lying flat but being adapted to be tilted to wedge between each support and the corresponding side of said rod to stop the sliding movement of said rod and said member, a shoulder on said rod positioned above said plates for engagement with the inner ends thereof, and resilient means for biasing each of said plates upwardly against said shoulder, subsequent to the contact of the movable electrode with the work, to thereby tilt said plates.

10. In a welding machine of the type having a fixed electrode and a movable electrode, mechanism for operating said movable electrode comprising a pair of fixed supports, a member slidably mounted thereon, a control rod attached to said member intermediate said supports, said rod being movable to effect sliding movement of said member, means resiliently coupling said movable electrode to said member in such a manner that when said member slides in one direction said movable electrode is moved into contact with the work, a separate plate lying atop said member on each side of said rod between said rod and the adjacent support, said plates normally lying flat but being adapted to be tilted to wedge between each support and the corresponding side of said rod to stop the sliding movement of said rod and said member, a shoulder on said rod positioned above said plates for engagement with the inner ends thereof, and separate resilient means for biasing each of said plates upwardly against said shoulder, subsequent to the contact of the movable electrode with the work, to thereby tilt said plates, one of said resilient means being the spring-biased operating member of a switch, said switch being operated by the tilting of its corresponding plate to control the welding circuit supplying current to said electrodes.

11. In a welding machine of the type having a fixed electrode and a movable electrode, mechanism for operating said movable electrode comprising a member slidably mounted on a fixed support, movable control means for effecting sliding movement of said member, means resiliently coupling said movable electrode to said member in such a manner that when said member slides in one direction said movable electrode is moved into contact with the work, said control means being effective after such contact to apply a pressure to said electrodes thereby placing such pressure upon the work, a plate lying atop said member, said plate normally lying flat but being adapted to be tilted to wedge between said support and said control means to stop the sliding movement of said member and said control means, and means for tilting said plate subsequent to the contact of the movable electrode with the work.

12. In a welding machine of the type having a fixed electrode and a movable electrode, mechanism for operating said movable electrode comprising a member slidably mounted on a pair of fixed supports, a control rod attached to said member intermediate said supports, said rod being movable to effect sliding movement of said member, a movable arm supporting said movable electrode, means resiliently biasing said arm into engagement with said member whereby when said member slides in one direction said movable electrode is moved into contact with the work, said control rod being effective on further movement thereof after such contact to apply a pressure to said electrodes thereby placing such pressure upon the work, a separate plate lying atop said member on each side of said rod between said rod and the adjacent support, said plates normally lying flat but being adapted to be tilted to wedge between each support and the corresponding side of said rod to stop the sliding movement of said rod and said member, and means for tilting said plates subsequent to the contact of the movable electrode with the work.

13. In a welding machine of the type having a fixed electrode and a movable electrode, mechanism for operating said movable electrode comprising a member slidably mounted on a fixed support, movable control means for effecting sliding movement of said member, means resiliently coupling said movable electrode to said member in such a manner that when said member slides in one direction said movable electrode is moved into contact with the work, said control means being effective after such contact to apply a pressure to said electrodes thereby placing such pressure upon the work, a plate lying atop said member, said plate normally lying flat but being adapted to be tilted to wedge between said support and said control means to stop the sliding movement of said member and said control means, means for tilting the plate subsequent to the contact of the movable electrode with the work, and a switch operated by the tilting of said plate to control the welding circuit supplying current to said electrodes.

14. In a welding machine of the type having a fixed electrode and a movable electrode, mechanism for operating said movable electrode comprising a member slidably mounted on a pair of fixed supports, a control rod attached to said member intermediate said supports, said rod being movable to effect sliding movement of said member, a movable arm supporting said movable electrode, a normally-stressed resilient means connected between said control means and said arm for biasing said arm into engagement with said member, whereby when said member slides in one direction said movable electrode is moved into contact with the work, said resilient means being effective on further movement of said rod after such contact to transmit pressure from said rod to said arm thereby placing such pressure upon the work, a separate plate lying atop said member on each side of said rod between said rod and the adjacent support, said plates normally lying flat but being adapted to be tilted to wedge between each support and the corresponding side of said rod to stop the sliding movement of said rod and said member, a shoulder on said rod positioned above said plates for engagement with the inner ends thereof, and resilient means for biasing each of said plates upwardly against said shoulder, subsequent to the contact of the movable electrode with the work, to thereby tilt said plates.

15. In a welding machine of the type having a fixed electrode and a movable electrode, mechanism for operating said movable electrode comprising a member slidably mounted on a pair of fixed supports, a control rod attached to said member intermediate said supports, said rod being movable to effect sliding movement of said member, a movable arm supporting said movable electrode, a normally-stressed resilient means connected between said control means and said arm for biasing said arm into engagement with said member, whereby when said member slides in one direction said movable electrode is moved into contact with the work, said resilient means being effective on further movement of said rod after such contact to transmit pressure from said rod to said arm thereby placing such pressure upon the work, a separate plate lying atop said member on each side of said rod between said rod and the adjacent support, said plates normally lying flat but being adapted to be tilted to wedge between each support and the corresponding side of said rod to stop the sliding movement of said rod and said member, a shoulder on said rod positioned above said plates for engagement with the inner ends thereof, and separate resilient means for biasing each of said plates upwardly against said shoulder, subsequent to the contact of the movable electrode with the work, to thereby tilt said plates, one of said resilient means being the spring-biased operating member of a switch, said switch being operated by the tilting of its corresponding plate to control the welding circuit supplying current to said electrodes.

RUFUS L. BRIGGS.

REFERENCES CITED

The following references are of record in the file of this patent:

UNITED STATES PATENTS

| Number | Name | Date |
|---|---|---|
| 1,579,721 | Leslie | April 6, 1926 |
| 1,728,616 | Kondakjian | Sept. 17, 1929 |